United States Patent

[11] 3,629,075

| [72] | Inventor | Heinrich Gutbier |
| | | Erlangen, Germany |
| [21] | Appl. No. | 714,527 |
| [22] | Filed | Mar. 20, 1968 |
| [45] | Patented | Dec. 21, 1971 |
| [73] | Assignee | Siemens Aktiengesellschaft |
| | | Berlin, Germany |
| [32] | Priority | Mar. 21, 1967 |
| [33] | | Germany |
| [31] | | S 108938 |

[54] METHOD AND APPARATUS FOR ELIMINATING WASTE HEAT AND REACTION WATER TOGETHER FROM FUEL CELLS
19 Claims, 7 Drawing Figs.

[52] U.S. Cl..................................................... 203/1,
203/2, 203/3, 203/DIG. 18, 203/DIG. 16, 203/11,
203/100, 203/91, 55/16, 55/158, 210/72, 210/176,
210/32, 136/86, 202/160, 202/185, 202/202
[51] Int. Cl..................................................... B01d 3/42
[50] Field of Search........................................... 203/10, 11,
100, 91, 1-3, DIG. 18, DIG. 16; 136/86, 86 C;
55/16, 158; 210/321, 176, 72

[56] References Cited
UNITED STATES PATENTS

| 2,445,350 | 7/1948 | Gennings | 202/172 |
| 2,720,980 | 10/1955 | Thomas | 210/72 |
| 2,827,173 | 3/1958 | Jones | 210/176 |
| 3,002,039 | 9/1961 | Bacon | 136/86 |
| 3,129,146 | 4/1964 | Hassler | 210/321 |
| 3,132,973 | 5/1964 | Duddy et al. | 136/86 |
| 3,172,784 | 3/1965 | Blackmer | 136/86 |
| 3,274,029 | 9/1966 | Lurie et al. | 136/86 |
| 3,300,341 | 1/1967 | Gregory et al. | 136/86 |
| 3,322,574 | 5/1967 | Justi et al. | 136/86 |
| 3,340,186 | 9/1967 | Weyl | 203/11 |
| 3,370,984 | 2/1968 | Platner | 136/86 |
| 3,378,403 | 4/1968 | Waubke et al. | 136/86 |
| 3,385,769 | 5/1968 | Brose | 210/321 |
| 3,455,743 | 7/1969 | Huebscher et al. | 136/86 |

*Primary Examiner*—Wilbur L. Bascomb, Jr.
*Attorneys*—Curt M. Avery, Arthur E. Wilfond, Herbert L. Lerner and Daniel J. Tick ABSTRACT: Method of eliminating waste heat and reaction water together from a fuel cell or battery includes bringing the fuel cell electrolyte into contact with a porous diaphragm through the pores of which water necessary for removing waste heat diffuses only in vaporous form, passing separated water vapor diffusing through the diaphragm to a cooled condensation surface lying opposite and closely adjacent the diaphragm, and depositing thereon condensation water produced from the water vapor, and alternatively returning the condensation water thus formed to the fuel cell electrolyte and removing the condensation water from the fuel cell through a pressure lock.

Apparatus for carrying out the foregoing method includes a chamber traversible by the electrolyte, the chamber being defined on at least one side by a porous diaphragm, and a condensation surface communicating with said porous diaphragm through a closed gas chamber therebetween and defined thereby.

METHOD AND APPARATUS FOR ELIMINATING WASTE HEAT AND REACTION WATER TOGETHER FROM FUEL CELLS

My invention relates to method and apparatus for eliminating waste heat and reaction water together from fuel cells.

Many methods have become known heretofore for eliminating the reaction water formed in the electrolyte of fuel cells. In most cases, the separation of the reaction water from the electrolyte is effected by vaporizing the water and then condensing the vapor. Thus, the vaporized water is entrained from the conventionally porous electrodes of the fuel cell by one of the reaction gases circulating through the fuel cell and is deposited as liquid water in a condenser outside the fuel cell. For energistic reasons, the waste heat that is produced in the fuel cell is not completely removed through the gas circulatory loop of the fuel cell. A predominant portion of the heat is discharged from the fuel cell through the circulatory loop of the electrolyte. In order to make the water removal largely independent of load variations of the fuel cell, it has been proposed in French Pat. No. 1,463,299 to effect the water vapor saturation of the reaction gas or inert gas outside the fuel cell. According to the method of the just-mentioned French patent, the electrolyte heated by the waste heat of the fuel cell and passing through the circulatory loop thereof is brought into contact with a carrier gas in an electrolyte cooler. The carrier gas absorbs water in vaporous form from the electrolyte and carries it away. An additional cooler for removing the waste heat is thus not required for the system of the French patent.

In my copending U.S. application Ser. No. 694,252, filed Dec. 28, 1967, and now abandoned, I propose that the reaction water be removed by bringing the electrolyte in contact with a porous diaphragm so that the water vapor diffuses through the diaphragm, and passing the thus separated water vapor through a gas chamber to a cooled condensation surface, located opposite and spaced from the porous diaphragm, whereat the water vapor condenses or the water vapor is forced through a porous cooled condensation wall. The waste heat produced in the fuel cell is thereby removed as heat of vaporization, whereby the cooling power is more-or-less further increased by heat conduction between the vaporization surface and the condensation surface.

Whereas the waste heat per cm.$^2$ of active surface produced in a fuel cell depends both upon the cell voltage as well as the current density, the quantity of water produced per cm$^2$ of active surface is dependent only on the current density and, in fact, becomes constantly smaller with increasing current density of the portion of the waste heat which can be removed in the form of heat of vaporization. The waste heat which cannot be removed by vaporization from the electrolytes must then be discharged from the system in an additional heat exchanger.

It is accordingly an object of my invention to provide method and apparatus for carrying out the method of eliminating waste heat and reaction water together from fuel cells which avoids the disadvantages of heretofore known methods and apparatus of this general type.

With the foregoing and other objects in view, I provide method of eliminating waste heat and reaction water together from a fuel cell or battery which comprises bringing the fuel cell electrolyte into contact with a porous diaphragm through the pores of which water necessary for removing waste heat diffuses only in vaporous form, passing separated water vapor diffusing through the diaphragm to a cooled condensation surface lying opposite and closely adjacent the diaphragm, and depositing thereon condensation water produced from the water vapor, and alternatively returning the condensation water thus formed to the fuel cell electrolyte and removing the condensation water from the fuel cell through a pressure lock.

In accordance with my invention I provide apparatus for carrying out the foregoing method comprising a chamber traversible by the electrolyte, the chamber being defined on at least one side by a porous diaphragm, and a condensation surface communicating with the porous diaphragm through a closed gas chamber therebetween and defined thereby.

Other features which are considered as characteristic for the invention are set forth in the appended claims.

Although the invention is illustrated and described herein as method and apparatus for eliminating waste heat and reaction water together from fuel cells, it is nevertheless not intended to be limited to the details shown, since various modifications and structural changes may be made therein without departing from the spirit of the invention and within the scope and range of equivalence of the claims.

The construction of the apparatus and the method of operation thereof, however, together with additional objects and advantages thereof, will be best understood from the following description of specific embodiments of the apparatus and modes of the method when read in connection with the accompanying drawings, in which.

Figure 1:
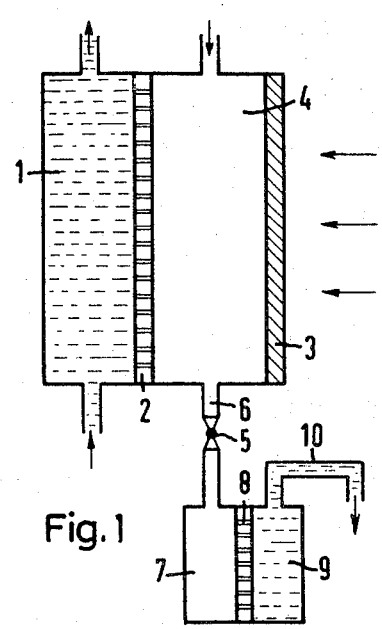
FIGS. 1–3 are diagrammatic views of three different embodiments of apparatus for eliminating waste heat and reaction water together from a fuel cell in accordance with my invention.

Referring now to the drawings and first particularly to FIG. 1 thereof, there is schematically shown therein an embodiment of the apparatus of my invention which is in its simplest form. The apparatus of FIG. 1 includes a chamber 1 traversed by an electrolyte and separated by a porous diaphragm 2 from a condensation chamber 4 separating the porous diaphragm 2 from a nonporous condensation surface on the wall 3 which is cooled by air as shown by the associated arrows, but which may of course also be cooled by water or any other suitable fluid. The condensation chamber 4 is gastightly closed and is subjected to pressure. Water formed in the electrolyte in chamber 1 diffuses only in the form of water vapor through the porous diaphragm 2 and condenses on the surface of the wall 3, accumulating initially in the discharge tube 6 and later at the bottom of the condensation chamber 4. When the accumulated water rises from the discharge tube 6 above the floor of the condensation chamber 4 it comes into contact with the porous diaphragm 2 and is forced back through the diaphragm 2 into the electrolyte in the chamber 1 due to the existing superpressure in the condensation chamber 4. If the spacing between the vaporization surface and the condensation surface is kept very small, those drops of water having a diameter equal to the length of the spacing before reaching the water level at the floor of the chamber 4 even before combining with the liquid on the floor of the chamber 4, are partly or entirely forced through the pores of the diaphragm into the electrolyte chamber 1. In the heat exchanger, a portion of the porous diaphragm serves as a sluice or lock for the return of the water to the electrolyte chamber 1.

The removal of the reaction water takes place, when the valve 5, preferably a magnetic valve, is open, through a pressure lock or sluice formed of an airtightly closed gas chamber 7 and a liquid chamber 9 separated from the gas chamber 7 by a porous diaphragm 8, and an overflow pipe 10 connected to the liquid chamber 9.

The removal of the reaction water is suitably carried out discontinuously, the valve 5 being controlled accordingly by an electrolyte level indicator or an electrolyte concentration measuring device (not shown) located in the circulatory loop of the electrolyte and being of conventional construction. To remove the waste heat, the coolant flow is controlled by a temperature measuring sensor (not shown) located in the electrolyte or in the fuel cell proper, the control being effected in such a manner that the respective required temperature is established at the condensation surface.

Figure 2:
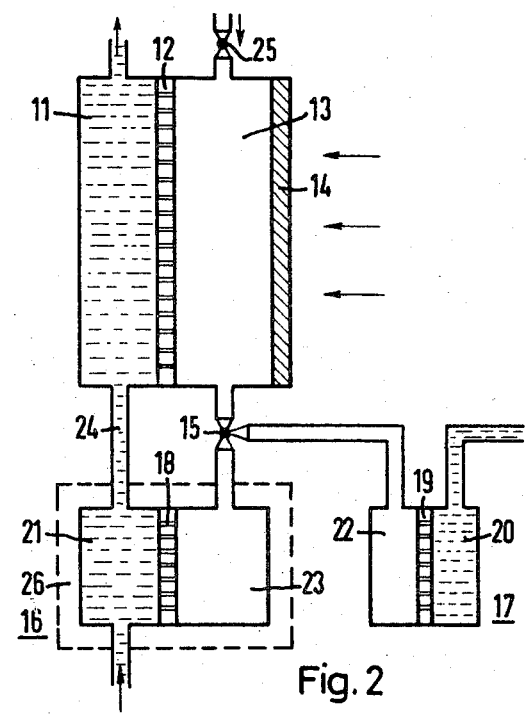

According to the embodiment of FIG. 2, the entire condensation water can also be initially discharged from the heat exchanger and then either returned to the electrolyte circulating loop or removed from the system with the aid of a controlled three-way valve or stop cock through pressure sluices or locks.

In FIG. 2, there is shown a chamber 11 traversed by electrolyte and a condensation chamber 11 separated from the electrolyte chamber 11 by a porous diaphragm 12 which is spaced from a condensation surface of a wall 14 forming another side of the condensation chamber 13 and which is nonporous, has good heat conductivity and is cooled by air as shown diagrammatically by the associated arrows, or cooled by water or thermoelectrical elements or the like, if desired. The condensation chamber 13 is connected through the three-way valve 15 with pressure locks 16 and 17. The vaporized water for removing the waste heat from the electrolyte is returned to the circulatory loop through the pressure lock 16, and the reaction water is removed through the pressure lock 17. The control of the three-way valve 15 can be effected in a similar manner as described hereinbefore with regard to FIG. 1 through a nonillustrated level indicator or an electrolyte concentration measuring device, i.e., the inlet to the lock 17 is free only for removing the reaction water that is formed when the concentration of the electrolyte drops below the adjusted nominal value thereof. The pressure locks 16 and 17 are formed respectively from porous diaphragms 18 and 19 which respectively separate the electrolyte- and water-filled chambers 20 and 21 from the respective gas chambers 22 and 23, the pressure lock 16 being connected with the electrolyte chamber 11 through the tube 24.

To maintain the electrolyte temperature, the pressure lock 16 is advantageously provided with heat insulation diagrammatically represented by the dotted line 26. The control of the cooling is effected as aforedescribed with regard to the embodiment of FIG. 1 by employing nonillustrated temperature measuring sensors.

The compressed gas necessary for sealing the electrolyte chamber is supplied through the tube 25 to the condensation chamber 13. Since water molecules diffuse particularly well in hydrogen, hydrogen is very suitable for use as the pressure gas, and the tube 25 can therefore be directly connected to the gas chamber of the fuel cell wherein hydrogen is supplied as fuel gas.

In order to prevent penetration of the electrolyte into the condensation chamber 4, 13 when pressure variations occur, the gas supply duct 25 is advantageously provided with a suitable protective valve, as illustrated diagrammatically.

Figure 3:
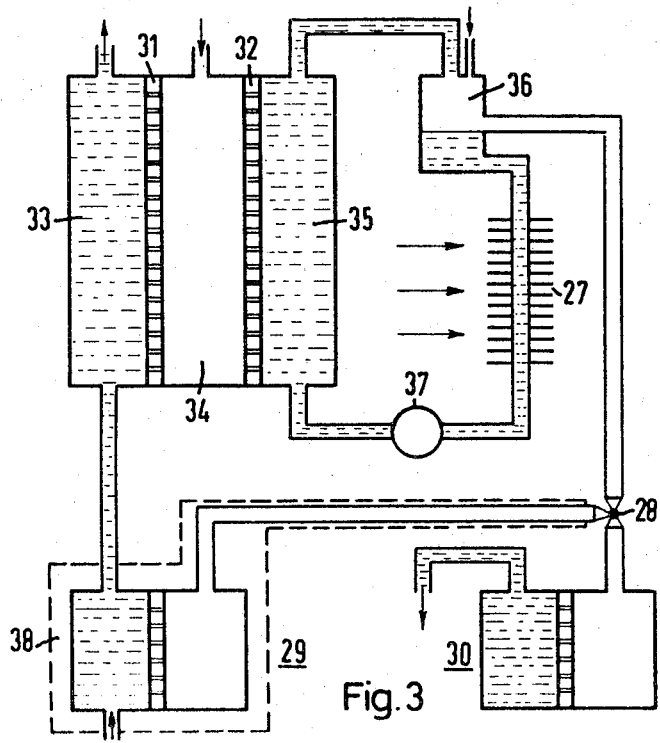

In the embodiment of the apparatus for carrying out the method of the invention as shown in FIG. 3, the coolant surface of the heat exchanger is formed of a porous membrane through which the water vapor diffusing from the electrolyte is directly forced into the coolant liquid. Accordingly, the coolant liquid traverses a circulatory loop wherein an overflow vessel 36 and a circulating pump 37 are connected. The removal of waste heat conducted from the electrolyte is effected by cooling with blown air, for example, as shown by the associated arrows impinging on cooling fins 27 that are disposed in the circulatory loop between the overflow vessel 36 and the circulating pump 37.

The condensation water forced into the coolant flows out of the overflow vessel 36 and is returned through a three-way valve 28 of the type shown in FIG. 2 through the sluice or lock 29 to the electrolyte or is discharged through the lock 30. The pressure lock 29, as shown by the dotted line, is surrounded by thermal insulation 38.

The heat exchanger of FIG. 3 is shown provided with a porous vaporization surface 31 and a porous coolant surface 32, and has an electrolyte chamber 33, a diffusion chamber 34, and is provided with a coolant loop 35. The pressure equalizing ducts required for permitting the outflow of the condensation water from the condensation chamber or the overflow vessel has not been shown in the schematically illustrated embodiments of FIGS. 1–3 so as to avoid obliteration of other detail and undue complexity of the figures.

As aforementioned, the discharge of the reaction water advantageously takes place discontinuously, the valve 5 of the embodiment shown in FIG. 1 and the valves 15 and 28 respectively in the embodiments of FIG. 2 and 3 are controlled by an electrolyte level indicator or an electrolyte concentration measuring device of conventional construction suitably disposed in the circulatory loop of the electrolyte. The installation of the control devices provided for removing the reaction water as well as the waste heat is shown schematically in FIG. 4.

Figure 4:
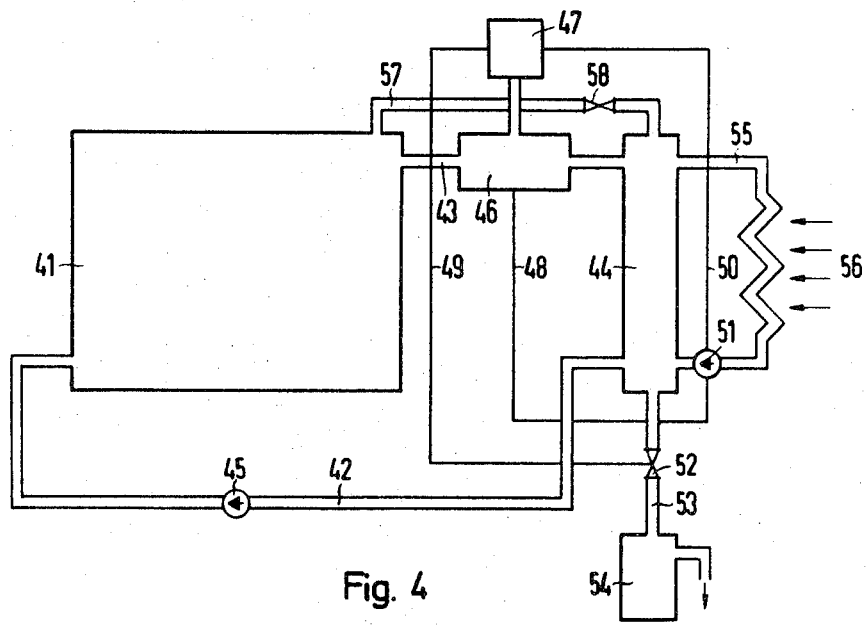
FIG. 4 is a diagrammatic view of a circulatory system including a battery of fuel cells connected with a water- and heat-separating cell according to my invention.

In the circulatory system of FIG. 4 there is shown a fuel cell battery 41 which is connected by the tubes 42 and 43 with a water separating cell 44 according to the invention. A pump 45 for the electrolyte circulatory loop is connected between the battery 41 and the cell 44 in tube 42, and a temperature measuring device 46 as well as a concentration measuring device 47 are connected in the tube 43, the temperature measuring device 46 being connected through the lead 48 with the pump 51, and the concentration measuring device 47 being connected through the leads 49 and 50 respectively with a valve 52 and a pump 51. A water discharge tube 53 leads from the water separating cell 44 to the water collecting vessel 54 which, in the manner shown in the embodiment of FIGS. 1–3, is connected with a pressure sluice or lock (not shown in FIG. 4). The tube system 55 in the structure disclosed in FIG. 4 serves for circulating the liquid employed for cooling the water separating cell 44, the tube system 55 being additionally cooled at the various locations thereof indicated by the arrows 56 by blowing air for example. If one of the reaction gases of the fuel cell is employed in the gas chamber of the water separating cell 44, the supply of the gas from the gas chamber of the fuel cell battery 41 to the water separating cell 44 takes place through the connecting tube 57 wherein a protective valve 58 is advantageously installed. The pressure in the gas chamber of the water separating cell 44 can accordingly be the same as the pressure in the gas chamber of the fuel cell battery 41 or can be reduced by passing through a reducing valve.

As measurements have indicated, the adjusted temperature equilibrium in the electrolyte and coolant circulatory loop are practically unaffected by the discontinuous removal of reaction water except in the embodiment shown in FIG. 1. With regard to the embodiment of FIG. 1 it must be surprisingly acknowledged that even after the two-way valve 5 has been closed for several hours, a transfer of KOH does not occur into the condensation chamber 4. The water accumulating at the floor of the condensation chamber 4 was always neutral when tested, and is accordingly forced back relatively rapidly into the electrolyte chamber 1 through the diaphragm 2 without any diffusion of KOH taking place. With porous asbestos diaphragms, a mean delay time of 1–2 minutes for the water in the condensation chamber to diffuse into the electrolyte chamber was ascertained.

The apparatus according to my invention for removing waste heat and reaction water together is particularly distinguished by the fact that it considerably simplifies the required cooling system, and load variations in the fuel cell battery do not have to be intercepted as heretofore by additional devices or by increasing the dimensions of the water separating device.

As is generally known, the rate of evaporation sharply decreases with decreasing electrolyte temperature. For example, assuming a mean condensation temperature of 30° C. and a drop in electrolyte temperature from 60° C. to 50° C. (which is generally the case for relatively frequent power variations), the evaporation rate reduces from 0.32 cm.$^3$/cm.$^2$ h. to 0.13 cm.$^3$/cm.$^2$ h., e.g. to about two-fifths of the original value. In the same interval of time, however, the current density decreases and the quantity of reaction water is reduced therewith only about 20 percent of the quantity of water formed at 60° C.

In order to ensure the removal of reaction water in a conventional water separating device even at 50° C., the evaporating surfaces must have dimensions that are about double the conventional dimensions, i.e. at the conventional operating temperature proper, the apparatus is subjected to only half the load that it can actually accommodate. With the method of heat exchange by condensation according to the invention of this application, increased dimensioning is not required with respect to such cases, because the quantity of water to be evaporated so as to eliminate the waste heat is generally about three times as great as the quantity of reaction water that is to be eliminated.

The apparatus shown in FIGS. 1-3 can, of course, be further modified within the scope of my invention. Thus, for example, the output of the heat exchanger can be increased considerably if the electrolyte chamber is formed with a double wall, i.e. is provided on both sides thereof shown in FIGS. 1-3 with porous diaphragms and condensation chambers. Several of such heat-exchanger units can be united into one heat-exchanger system, as shown in FIG. 5, and in fact in such a manner that the electrolyte chambers are enclosed on both sides by a gas chamber and cooling chamber.

Figure 5:
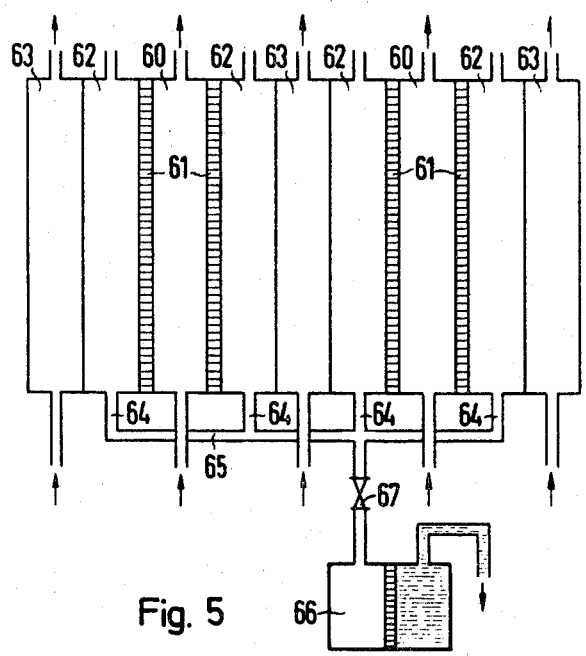
FIG. 5 is a diagrammatic view of a heat exchanger system forming part of the apparatus of my invention.

In the heat-exchanger system schematically shown in FIG. 5, there are provided electrolyte chambers 60 to which supply and discharge tubes, identified by the associated arrows indicating the flow direction of the electrolyte, are connected. The electrolyte chambers 60 communicate through diaphragms 61 with adjacent gas chambers 62. Cooling chambers 63, traversable by water through associated connecting tubes identified by arrows indicating the water flow direction, condense the vapor of reaction water diffusing from the electrolyte chambers 60 through the diaphragms 61 into the gas chambers 62 so that liquid water accumulates at the bottom of the gas chambers 62 and passes through the connecting tubes 64 and the manifold tube 65 into the pressure sluice or lock 66. A valve 67 is provided in the water discharge system 64,65 for discontinuously removing the water, as desired.

One or more heat exchangers can either be mounted at the outside of a fuel cell battery, especially at an end thereof, or can be disposed between the individual cells or cell packets.

Figure 6:
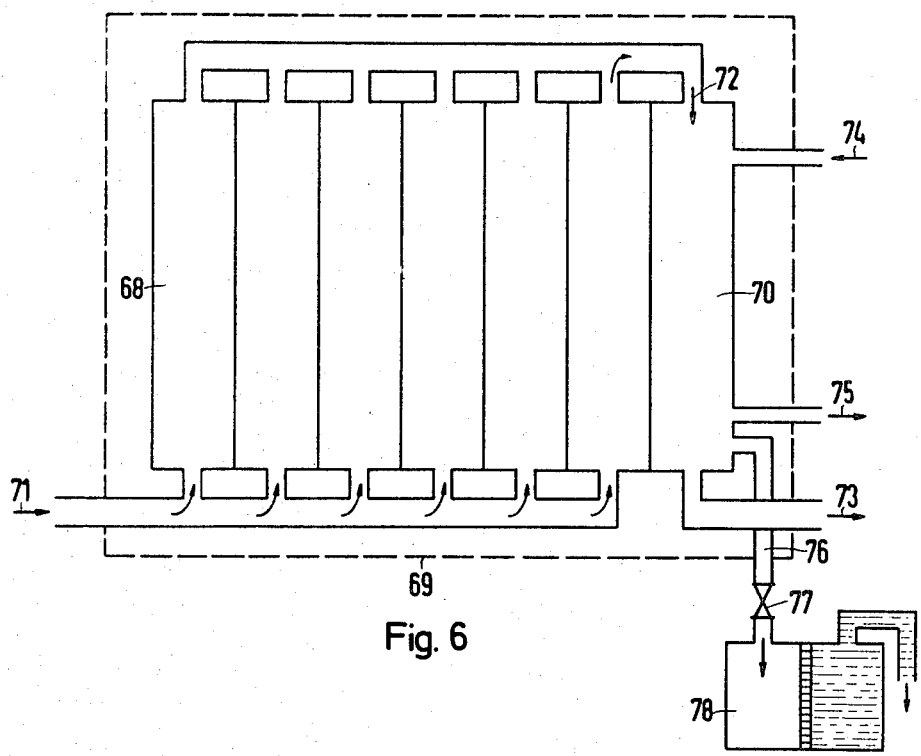
FIG. 6 is a diagrammatic view of a fuel cell battery incorporating a water- and heat-removing cell of my invention.

In the especially advantageous embodiment of the invention shown in diagrammatic form in FIG. 6, the electrolyte, gas and cooling chambers of the heat-exchanger system have the outer shape of the fuel cell and are located at the end of a group of six fuel cells 68 that are combined into a battery 69. The electrolyte, gas and coolant chambers are located in the water-separating cell 70. The supply of the electrolyte to the diagrammatically shown fuel cells 68 is effected, respectively, through the manifold tube 71, and the discharge of the electrolyte from the fuel cells 68 is effected through the manifold tube 72, the water-separating cell 70 and the discharge tube 73. The water-separating cell 70 can be provided either with a nonporous porous cooled condensation surface according to the embodiment of FIG. 1 or with a porous cooled condensation surface according to the embodiment of FIG. 3. The coolant liquid is accordingly admitted through the connecting tube 74, traverses the water-separating cell 70 and discharges therefrom through the connecting tube 75, and is thereafter recirculated through a circulatory loop, if desired. A duct 76 provided with a valve 77, to which a pressure sluice or lock 78 is connected, is employed for discharging the condensation water out of the water-separating cell.

Heat exchange and reaction water removal can be carried out, however, in an individual fuel cell. The porous electrode, in such case, either partly or entirely assumes the function of a diaphragm, and the gas chamber located downstream of the electrode takes the place of the condensation chamber. The deposition of liquid water from the water vapor is achieved by cooling the cooling plate located in the fuel cell so that a corresponding temperature gradient is produced between the porous electrode and the condensation plate.

Figure 7:
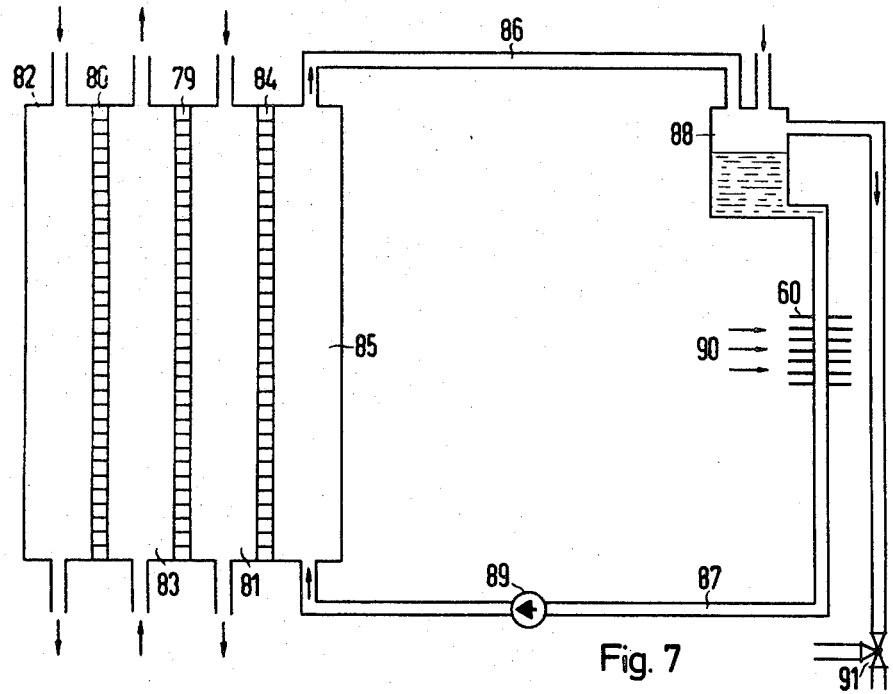
FIG. 7 is a diagrammatic view of a circulatory system including a modified form of a water separating cell from that shown for example in FIG. 3.

An embodiment of the just mentioned structure is shown in FIG. 7. The fuel cell is formed of the porous-hydrogen electrode 79 and the porous-oxygen electrode 80 adjacent which the gas chambers 81 and 82, respectively, are located. The electrolyte chamber 83 is located between the electrodes 79 and 80. The separation of the reaction water is effected in accordance with the invention through the porous condensation surface 84. When employing an alkaline electrolyte, the condensation surface 84 is located adjacent the hydrogen gas chamber, and when employing an acid electrolyte, it is located adjacent the oxygen gas chamber. A cooling chamber 85 for condensing the reaction-water vapor is provided adjacent the other side of the condensation surface 84 and is connected through the ducts 86 and 87 with an overflow vessel 88. A pump 89 is located in the duct 87 for forcing liquid coolant through the cooling chamber 85, and cooling fins 60 are provided on the duct 87 and are cooled for example by blowing air as indicated by the arrows 90 or by any other suitable fluid or a thermoelectrical cooling block.

The condensation water forced into the coolant water flows out of the overflow vessel 88 and, in the same manner as shown in FIG. 3, is removed through a three-way valve 91 or is returned to the electrolyte.

The just-mentioned embodiment is naturally not limited to only a single fuel cell. On the contrary, additional water-separating cells and fuel cells are connected to the oxygen chamber 82, in which case, it is advantageous to combine several water-separating cells into a single coolant circulatory loop.

The diaphragms in the heat exchanger should preferably be very thin and of high porosity and can consist of virtually all kinds of porous members which are resistant to the electrolyte such as nylon filters and asbestos paper and also porous masses of ceramic and sintered glass. Due to their relatively good heat conductivity, metals or sintered porous plates of metal or porous metal foils are especially useful. When employing nonporous material as condensation plates, it is advantageous to install those which have a good heat conductivity. Porous condensation plates can, however, consist of other materials. In order to achieve the highest possible condensation rate or cooling power in the heat exchanger, the spacing between the diaphragms and the condensation surfaces as aforementioned should be kept as small as possible. It has been found to be particularly suitable that the spacing therebetween be from 0.5-5 mm. In the heretofore mentioned embodiments, the penetration of the liquid into the gas chamber is prevented by the pressure of the gas in the gas chamber. However, such penetration can also be avoided by providing a diaphragm or a porous condensation surface which is either partly or entirely made of a hydrophobic material or a material which has been treated so that it is hydrophobic. The treatment which renders the material partly hydrophobic is such as to make only the sides of the porous plates which engage the gas chamber hydrophobic.

The function of a heat exchanger according to the embodiment of FIG. 1 is further described hereinafter in an example.

Asbestos paper having a thickness of 0.3 mm. and a volume porosity of about 75 percent was employed as the porous diaphragm, and the condensation surface was provided on a cooling plate whose opposite surface is cooled with water. The spacing between the asbestos membrane and the cooling plate was 2.5 mm. and the area thereof was, respectively, 300 cm.$^2$. Hydrogen at 0.4 atmospheres absolute pressure was employed as the pressure gas. The mean electrolyte temperature was 65° C. The coolant water passing through the circulatory loop was cooled in an air cooler. The water temperature upstream and downstream of the cooler, as well as the coolant water stream were measured. The condensation water was able to flow out of an opening in the base of the condensation chamber, through a regulated valve and into the pressure lock. Pressure equalizing ducts accounted for an unhampered discharge of the water. When the valve was open, the water flowed into the pressure lock which was provided with a porous cooling membrane having an area of 12 cm.$^2$ through which the water was forced out of the system.

For a fuel cell battery having a 2-kilowatt rated output, the output heat loss is about 2 kilowatts, i.e. 3.2 liters of water per hour must be vaporized to remove the output heat loss.

For an evaporation output of 0.5 cm.$^3$ per hour, which is produced at 65° C. by 6 $n$ KOH using an asbestos diaphragm and a 3 mm. depth of the condensation chamber, 6,400 cm.$^2$ of evaporating surface is accordingly required if the heat conduction of the pressure gas is not also taken into consideration. When using hydrogen as the pressure gas, the required surface is reduced to about 4,000 cm.$^2$ due to the relatively great heat conductivity of hydrogen. The active surface of the fuel cells corresponding to a 2-kilowatt battery is about 25,000 cm.$^2$.

If the active surface of the individual cell is for example 600 cm.$^2$, it is advantageous structurally to make the heat exchanger with an active surface that is also 600 cm.$^2$ in area. In heat exchangers wherein the electrolyte chambers are provided on both sides with diaphragms, six or four heat exchangers must be connected in parallel.

I claim:

1. Method of eliminating together, from a fuel cell or battery, waste heat and reaction water produced by reaction of gases in the fuel cell, which comprises circulating electrolyte from the electrolyte chamber of the fuel cell through a water-separating chamber, bringing electrolyte of the fuel cell into contact in the water-separating chamber with a porous diaphragm permeable to water vapor but impermeable to water so that reaction water only in the form of water vapor bearing all of the waste heat produced by the reaction diffuses through the diaphragm from the electrolyte, passing the diffused heat-bearing water vapor to a condensation surface located opposite and closely adjacent the diaphragm and cooled to a temperature at which all of the waste heat is removed by the water vapor diffusing through the diaphragm and condensing on the condensation surface, the temperature being adjusted by a coolant flow regulated in response to a temperature sensing device located in the electrolyte circuit, depositing on the cooled condensation surface water condensed from the water vapor, removing the condensation water from the vicinity of the cooled condensation surface through an adjustable valve controllable in response to a measured value of electrolyte in the electrolyte circuit for alternatively returning at least part of the condensation water from the water-separating chamber to the electrolyte chamber and eliminating at least part of the condensation water from the water-separating chamber and out of the electrolyte circuit through a pressure lock.

2. Method according to claim 1 wherein the return of condensation to the electrolyte for maintaining predetermined electrolytic concentration therein is automatically effected through the porous diaphragm.

3. Method according to claim 1 wherein the return of condensation to the electrolyte for maintaining predetermined electrolytic concentration therein is effected through the pressure lock.

4. Method according to claim 1 which includes adjusting the valve in accordance with the volume level of the electrolyte.

5. Method according to claim 1 which includes adjusting the valve in accordance with the concentration of the electrolyte.

6. Method according to claim 4 which includes regulating the coolant flow so as to vary the cooling action thereof on the condensation surface in accordance with the volume level of the electrolyte.

7. Method according to claim 5 which includes regulating the coolant flow so as to vary the cooling action thereof on the condensation surface in accordance with the concentration of the electrolyte.

8. Apparatus for eliminating together, from a fuel cell or battery, waste heat and reaction water produced by reaction of gases in the fuel cell, comprising a heat exchanger including a chamber connected in an electrolyte circulatory loop traversed by electrolyte from the fuel cell, a porous diaphragm permeable to water vapor and impermeable to water defining said chamber on at least one side thereof, a gas chamber communicating with said electrolyte chamber through the pores of said diaphragm, a condensation surface located in said gas chamber opposite and closely adjacent said diaphragm for condensing water vapor bearing waste heat produced by the reaction and diffusing from the electrolyte, through the diaphragm and into the gas chamber and inlets and outlets to said electrolyte chamber and said gas chamber, coolant means for cooling the condensation surface to a temperature at which all of the waste heat is removed by the water vapor diffusing through the diaphragm and condensing on the condensation surface and thereby adjusting the temperature of said condensation surface, temperature sensing means located in said electrolyte circulatory loop and connected with said coolant means for regulating the cooling action thereof on said condensation surface, pressure lock means connected to said chamber for removing condensation water therefrom, said pressure lock means being connected to said gas chamber through said outlet thereof and being located outside said heat exchanger, a controllable valve located in said gas chamber outlet between said gas chamber and said pressure lock means, and means for regulating said controllable valve in accordance with a measured value of electrolyte in said electrolyte chamber.

9. Apparatus according to claim 8 wherein the condensation surface is located on a nonporous material.

10. Apparatus according to claim 8 wherein the condensation surface is located on a porous material.

11. Apparatus according to claim 8 wherein said regulating means comprises an electrolyte level indicator located in said electrolyte chamber and connected to said valve for regulating said valve to adjust the discharge of condensation water therethrough in accordance with the level of the electrolyte.

12. Apparatus according to claim 8 wherein said regulating means comprises an electrolyte concentration measuring device located in said electrolyte chamber and connected to said valve for regulating said valve to adjust the discharge of condensation water therethrough in accordance with the concentration of the electrolyte.

13. Apparatus according to claim 8 wherein said electrolyte chamber is connected in an electrolyte circulatory loop passing through the fuel cell, and including temperature sensing means located in said electrolyte circulatory loop within the fuel cell and connected with said coolant means for regulating the cooling action thereof on said condensation surface.

14. Apparatus according to claim 8 including an electrolyte level indicator located in said electrolyte chamber and connected to said coolant means for adjusting the cooling action of said coolant means on said condensation surface in accordance with the level of electrolyte in said electrolyte chamber.

15. Apparatus according to claim 8 including an electrolyte concentration measuring device located in said electrolyte chamber and connected to said coolant means for adjusting the cooling action of said coolant means on said condensation surface in accordance with the concentration of electrolyte in said electrolyte chamber.

16. Apparatus according to claim 8 including means for subjecting said gas chamber to gas pressure with a gas selected from the group consisting of hydrogen, oxygen and air.

17. Apparatus according to claim 8 including a coolant chamber adjacent said condensation surface for cooling the same, said electrolyte chamber, gas chamber and coolant chamber having the outer appearance of the fuel cell and being connected to the fuel cell at the end of a combined battery of fuel cells.

18. Apparatus according to claim 8 including a coolant chamber adjacent said condensation surface for cooling the same, said electrolyte chamber, gas chamber and coolant chamber having the outer appearance of the fuel cell and being located intermediate fuel cells combined into a battery.

19. Apparatus according to claim 8 wherein said electrolyte chamber, said porous diaphragm, said gas chamber, said condensation surface, and inlets and outlets to said electrolyte chamber and said gas chamber constitute a heat exchanger, a plurality of said heat exchangers being connected into one system with the electrolyte chambers thereof being enclosed on both sides by a gas chamber and a coolant chamber.

* * * * *